United States Patent
Gan

(10) Patent No.: US 9,430,210 B2
(45) Date of Patent: Aug. 30, 2016

(54) METHOD AND APPARATUS FOR INTEGRATING JAVA SOFTWARE INTO MOBILE TERMINAL, AND MOBILE TERMINAL

(75) Inventor: Qiang Gan, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 217 days.

(21) Appl. No.: 13/544,747

(22) Filed: Jul. 9, 2012

(65) Prior Publication Data

US 2012/0278798 A1 Nov. 1, 2012

Related U.S. Application Data

(63) Continuation of application No. PCT/CN2010/076784, filed on Sep. 10, 2010.

(30) Foreign Application Priority Data

Jan. 22, 2010 (CN) .......................... 2010 1 0103675

(51) Int. Cl.
*G06F 9/45* (2006.01)
*G06F 9/445* (2006.01)
*G06F 17/30* (2006.01)
*G06Q 20/30* (2012.01)

(52) U.S. Cl.
CPC ................. *G06F 8/61* (2013.01); *G06F 17/30* (2013.01); *G06Q 20/30* (2013.01)

(58) Field of Classification Search
CPC ....................................................... G06F 8/61
See application file for complete search history.

(56) References Cited

U.S. PATENT DOCUMENTS

| 5,966,540 | A | 10/1999 | Lister et al. | |
|---|---|---|---|---|
| 6,370,686 | B1* | 4/2002 | Delo | G06F 8/61 717/174 |
| 7,079,839 | B1* | 7/2006 | Papineau | 455/418 |
| 8,646,059 | B1* | 2/2014 | von Behren | G06Q 20/367 719/311 |
| 2001/0029605 | A1* | 10/2001 | Forbes | G06F 8/61 717/170 |
| 2003/0145317 | A1* | 7/2003 | Chamberlain | G06F 8/61 717/177 |

(Continued)

FOREIGN PATENT DOCUMENTS

| CN | 1414492 | 4/2003 |
|---|---|---|
| CN | 1858708 | 11/2006 |

(Continued)

OTHER PUBLICATIONS

Mourad Debbabi et al., "Accelerating Embedded Java for Mobile Devices",[Online], IEEE 2005, pp. 80-85, [Retrieved from Internet on Feb. 19, 2014], <http://ieeexplore.ieee.org/stamp/stamp.jsp?tp=&arnumber=1509971>.*

(Continued)

*Primary Examiner* — Xi D Chen
*Assistant Examiner* — Ziaul A Chowdhury

(57) ABSTRACT

A method and an apparatus for integrating Java software into a mobile terminal are provided. The method includes: installing and resolving Java software configured with an extended attribute to obtain contact data corresponding to the extended attribute; and adding an option for starting the Java software to the user interface of the mobile terminal according to the contact data, where the contact data includes the location and format of the added option for the Java software, and the data of the application entry of the Java software.

7 Claims, 3 Drawing Sheets

(56) References Cited

U.S. PATENT DOCUMENTS

| | | | |
|---|---|---|---|
| 2003/0225774 A1* | 12/2003 | Davidov et al. | 707/100 |
| 2003/0237050 A1* | 12/2003 | Davidov et al. | 715/513 |
| 2004/0060045 A1* | 3/2004 | Hind | G06F 11/2247 717/174 |
| 2004/0143830 A1* | 7/2004 | Gupton | G06F 8/61 717/174 |
| 2005/0245249 A1 | 11/2005 | Wierman et al. | |
| 2006/0080351 A1* | 4/2006 | Powell et al. | 707/102 |
| 2006/0218536 A1* | 9/2006 | Kirilline et al. | 717/127 |
| 2006/0225066 A1 | 10/2006 | Vigil | |
| 2007/0006327 A1* | 1/2007 | Lal | G06Q 20/123 726/31 |
| 2007/0168953 A1* | 7/2007 | Diez et al. | 717/118 |
| 2008/0126974 A1* | 5/2008 | Fawcett | G06F 8/61 715/772 |
| 2011/0078081 A1* | 3/2011 | Pirzadeh | G06Q 20/20 705/44 |
| 2011/0110344 A1* | 5/2011 | Kristensen | H04M 1/2535 370/338 |
| 2012/0259775 A1* | 10/2012 | Gui | G06Q 20/32 705/41 |
| 2012/0284289 A1* | 11/2012 | Zhang | G06F 9/4443 707/755 |
| 2014/0280263 A1* | 9/2014 | Hui | G06F 17/30076 707/756 |

FOREIGN PATENT DOCUMENTS

| | | |
|---|---|---|
| CN | 1929646 A | 3/2007 |
| CN | 101158898 | 4/2008 |
| CN | 101400165 A | 4/2009 |
| CN | 101426032 A | 5/2009 |
| CN | 101799757 | 8/2010 |
| EP | 2 360 580 A1 | 8/2011 |
| JP | H08161252 A | 6/1996 |
| JP | H10222349 A | 8/1998 |
| JP | 2003216630 A | 7/2003 |
| JP | 2006048297 A | 2/2006 |
| JP | 2006259849 A | 9/2006 |
| JP | 2006286003 A | 10/2006 |
| KR | 20060057542 A | 5/2006 |
| WO | WO 2008/013577 A1 | 1/2008 |
| WO | WO 2009/059473 A1 | 5/2009 |

OTHER PUBLICATIONS

Esmertec, "Jbed CLDC Configurations and Profiles Supported", [Online], AG-2005, pp. 1-2, [Retrieved from Internet on Feb. 20, 2014], <http://web.archive.org/web/20060101095947/http://www.esmertec.com/solutions/>.*

Chen Lingfen et al. "Mobile development environments for electronic finance", [Online], 2010, pp. 99-119, [Retrieved from Internet on May 27, 2016], < http://scisweb.ulster.ac.uk/~kevin/IJEF2010.pdf>.*

Iulia Ion et al., "Extending the Java Virtual Machine to Enforce Fine-Grained Security Policies in Mobile Devices", [Online], 2007, pp. 1-16, [Retrieved from Internet on May 27, 2016], <http://ieeexplore.ieee.org/stamp/stamp.jsp?tp=&arnumber=4412992>.*

Yueh-Feng Lee et al., "A Configurable Java Architecture for Mobile Terminal Software Download", [Online], 2002 IEEE, pp. 144-149, [Retrieved from Internet on May 27, 2016], <http://ieeexplore.ieee.org/stamp/stamp.jsp?tp=&arnumber=993479>.*

Mattias Hellström et al., "Java Application in Mobile Devices", [Online], 2002-2003, pp. 1-44, [Retrieved from Internet on May 27, 2016], <http://kiosk.nada.kth.se/utbildning/grukth/exjobb/rapportlistor/2003/rapporter03/hellstrom_mattias_03029.pdf>.*

Notice of Reasons for Rejection dated Jul. 9, 2013 in connection with Japanese Patent Application No. 2012-530117.

Written Opinion of the International Searching Authority dated Dec. 16, 2010 in connection with International Patent Application No. PCT/CN2010/076784.

Office Action dated Jul. 30, 2013 in connection with Japanese Patent Application No. 10-2012-7008100.

International Search Report from the Chinese Patent Office issued in PCT/CN2010/076784 on Dec. 16, 2010.

Extended European Search Report and Annex issued in Munich in EP 10 19 7348 on Jul. 14, 2011.

Erich Gamma, et al., "Eclipse Plug-In Development", First Edition, SoftBank Publishing, Inc., Dec. 24, 2004, pp. 40-42 and 49. (No english version available).

Masahisa Kamataki, et al., "OpenGuidebook: OpenOffice.org 3", First Edition, Shoeisha Co., Ltd., Mar. 19, 2009, pp. 438-441. (No english version available).

Makoto Ono, "Do it with OpenOffice.org! How to Make Practical Use of Next Generation Office Suite, (6) Creating Add-On Packages Course", Software Design, Gijutsu-Hyoron Co., Ltd, vol. 187, May 18, 2006, pp. 165-175. (No english version available).

Miho Matsumoto, "ODF Report <PDF editing becomes possible!> Plugin for OpenOffice 3.0", I/O, Kogakusha Co., Ltd., Nov. 1, 2008, vol. 33, No. 11, p. 120 and 121. (No english version available).

* cited by examiner

METHOD AND APPARATUS FOR INTEGRATING JAVA SOFTWARE INTO MOBILE TERMINAL, AND MOBILE TERMINAL

CROSS-REFERENCE TO RELATED APPLICATIONS

This application is a continuation of International Application No. PCT/CN2010/076784, filed on Sep. 10, 2010, which claims priority to Chinese Patent Application No. 201010103675.0, filed on Jan. 22, 2010, both of which are hereby incorporated by reference in their entireties.

FIELD OF THE INVENTION

The present invention relates to a mobile terminal technology, and in particular, to a method and an apparatus for integrating Java software into a mobile terminal, and a mobile terminal.

BACKGROUND OF THE INVENTION

With the popularity of mobile phones, more and more people use the mobile phones not only for mobile communications such as making calls and sending short messages, but also for entertainment activities such as watching movies and playing games. To fully use various entertainment functions on a mobile phone, people need to download the required software to their mobile phones.

At present, many game operators usually use Java to develop game software that runs on a mobile phone. Users can use a mobile phone to dynamically download the Java game software through Java 2 Micro Edition (J2ME). According to J2ME, the downloaded Java software can be only started on the Java adapter for mobile (JAM) interface. Therefore, the downloaded Java software cannot be integrated into a local application on the mobile phone, for example, a user interface of functional modules such as the phone book, call record, or file manager, and thus, the downloaded Java software cannot be started on the user interface of any existing functional module of the mobile terminal.

SUMMARY OF THE INVENTION

Embodiments of the present invention are directed to a method and an apparatus for integrating Java software into a mobile terminal, and a mobile terminal, so as to solve the problem that the Java software cannot be started on the user interface of an existing functional module on a mobile phone.

To achieve the preceding purpose, one embodiment of the present invention provides a method for integrating Java software into a mobile terminal. The method includes:

installing and resolving Java software configured with an extended attribute to obtain contact data corresponding to the extended attribute; and adding an option for starting the Java software to a user interface of the mobile terminal according to the contact data, where the contact data includes the location and format of the added option for the Java software, and data of an application entry of the Java software.

One embodiment of the present invention provides an apparatus for integrating Java software into a mobile terminal. The apparatus includes:

a resolving module, configured to install and resolve Java software configured with an extended attribute to obtain contact data corresponding to the extended attribute; and an adding module, configured to add an option for starting the Java software to a user interface of the mobile terminal according to the contact data.

One embodiment of the present invention provides a mobile terminal. The mobile terminal includes the apparatus for integrating the Java software into the mobile terminal.

According to embodiments of the present invention, items such as the menu option, soft key, or list for starting the installed Java software is added to the user interface of an existing functional module of a mobile terminal, which does not affect the effect and function of the functional module of the mobile terminal. Thus, the installed Java software does not need to be started on a Java adapter for mobile (JAM) interface, and can be started quickly and conveniently.

DETAILED DESCRIPTION OF THE EMBODIMENTS

The technical solution of the present invention is hereinafter described in detail with reference to the accompanying drawings and exemplary embodiments.

One embodiment of the present invention provides a method for integrating Java software into a mobile terminal.

Figure 1:
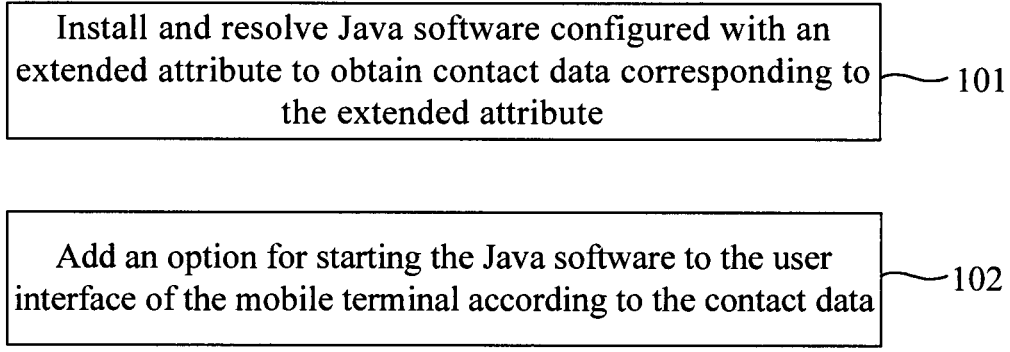
FIG. 1 is a flowchart of a method for integrating Java software into a mobile terminal according to one embodiment of the present invention.

FIG. 1 is a flowchart of a method for integrating Java software into a mobile terminal according to one embodiment of the present invention. As shown in FIG. 1, the method includes the following steps:

Step 101: Install and resolve Java software configured with an extended attribute to obtain contact data corresponding to the extended attribute.

In this embodiment, the contact data includes the location of the added option for the Java software and the data of the application entry of the Java software. The Java software generally includes a Java application descriptor (JAD) file and a Java archive (JAR) file. The Java software configured with the extended attribute can be integrated into a mobile terminal. The user interface for starting the Java software includes the soft key, menu option, or list that is configured on the user interface of the soft key, menu option, or list of an existing functional module. In this embodiment, the extended attribute of the Java software can be in the extensible markup language (XML). The extended attribute of the JAD file in the Java software can be set to "MIDletX- Integration:config.XML". The XML file corresponding to the extended attribute of "MIDletX-Integration:config.XML" is compressed and saved in the JAR file.

After the Java software is downloaded and installed on a mobile terminal, the mobile terminal resolves the extended attribute of the JAD file "MIDletX-Integration:config.XML", and then extracts the corresponding XML file from the JAR file according to the extended attribute, where the XML file includes the contact data corresponding to the extended attribute. The contact data includes the location of the added option for the Java software and the entry for starting the Java software. Then, step 102 is performed.

Step 102: Add an option for starting the Java software to the user interface of the mobile terminal according to the contact data.

In this embodiment, the user interface for starting the Java software can be added to the user interface of the phone book, which can be defined in the contact data. For example, the format of the user interface of the phone book is a menu. After the Java software is installed successfully, the soft key for starting or running the Java software is added in the drop-down menu of the phone book. The user may access the user interface of the Java software only by pressing this soft key. The user interface of the Java software may also be a menu option or a list.

According to the embodiment of the present invention, the menu option, soft key, or list for starting the installed Java software is added to the user interface of an existing functional module of a mobile terminal, which does not affect the effect and function of the functional module of the mobile terminal. Thus, the installed Java software does not need to be started on the JAM interface, and can be started quickly and conveniently.

Another embodiment of the present invention also provides a method for integrating Java software into a mobile terminal.

Figure 2:
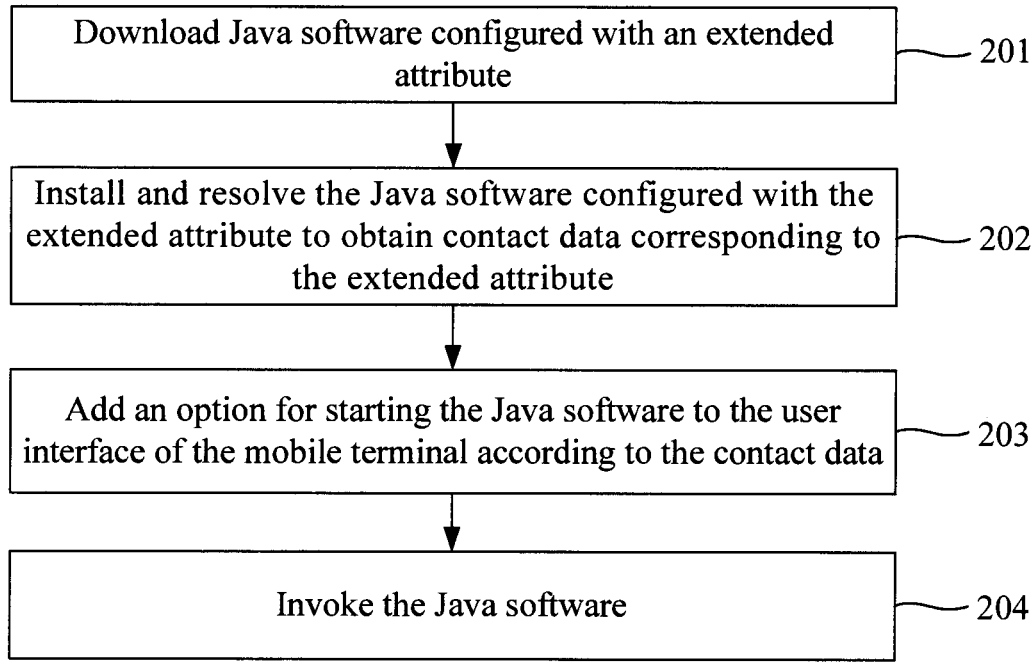
FIG. 2 is a flowchart of a method for integrating Java software into a mobile terminal according to another embodiment of the present invention.

FIG. 2 is a flowchart of the method for integrating Java software into the mobile terminal according to another embodiment of the present invention. As shown in FIG. 2, the method includes the following steps:

Step 201: Download the Java software configured with an extended attribute.

In this embodiment, the Java software can be game software which is frequently used by users and can also be Java software that is configured with the extended attribute and is searched for and downloaded from the Internet. The Java software with the extended attribute such as XML and TXT can be set on a mobile terminal.

Step 202: The Java software configured with the extended attribute is installed and resolved to obtain contact data corresponding to the extended attribute.

In this embodiment, the Java software configured with the extended attribute XML is taken as an example to describe the technical solution. The extended attribute of the JAD file in the Java software with the extended attribute XML can be set to "MIDletX-Integration:config.XML". The contact data corresponding to the extended attribute is compressed and saved in the JAR file. The contact data includes the location of the added option for the Java software and the entry for starting the Java software.

The extended attribute of the JAD file in the downloaded Java software is as follows:

MIDletX-Integration:config.XML //Indicates that the Java software can be integrated into the user interface of an existing functional module MIDlet-1: DragonFire, /icon.png, com.huawei.Midlet //Indicates that the Java software includes a small application millet-1 whose entry is com.huawei.Midlet The JAR file that matches the JAD file includes the config.XML file. The contact data of the JAR file includes the following contents:

```
<phonebook>    //Indicates that the Java software needs to
be integrated into the user interface of the phone book
        <contactMainScreen>    //Indicates that the Java
software needs to be integrated into the main list interface of the
phone book
            <optionMenu>    //Indicates that the Java software
needs to be integrated into the menu on the main list interface of
the phone book
                <item label="menu item1"> //Indicates that a
menu
option with the title of menu item1 is added
                    <command>com.huawei.Midlet
</command>//Indicates that the user interface is a user interface for
running the com.huawei.Midlet
                </item>
                <item>
                ......
                </item>
            </optionMenu>
        </contactMainlist>
</phonebook>
```

The preceding information indicates that the user interface of the Java software is added to the main list interface of the phone book and that the user interface is a menu option on the main list interface of the phone book. In the actual application, the contents of the JAR file may be modified according to actual requirements. The Java software may be integrated into the user interface of the call record and file manager.

Step 203: Add an option for starting the Java software to the user interface of the mobile terminal according to the contact data.

In this embodiment, after the Java software is installed, the installation information of the Java software is sent to the functional module corresponding to the phone book. When the functional module corresponding to the phone book is initially started or the functional module corresponding to the phone book receives the installation information of the Java software, the interface for obtaining the contact data is as follows:

```
getOptionMenuLabel
getOptionMenuCommandID
......
```

According to the obtained contact data, the user interface of the Java software, including the menu option, soft key or list for starting or running the Java software, appears on the menu of the main list interface of the phone book.

Step 204: Invoke the Java software.

When a user needs to start or run the Java software, the user starts or runs the main list interface of the phone book including the user interface of the Java software, and obtains the contact data and the application entry "com.huawei.Midlet" of the Java software. In this way, the Java software may be started.

In the actual application, the associated user interface may be the user interface of other common functional modules, for example, the user interface of the call record and file manager. The Java software may not clearly define the associated user interface. The Java software with the XML and TXT extended attribute can be integrated into the user interface of any common functional module of the mobile terminal. If the user deletes the Java software, the user interface of the Java software integrated on the mobile terminal is also deleted automatically.

According to the embodiment of the present invention, the user interface for starting the installed Java software is added to the user interface of an existing functional module of a mobile terminal, which does not affect the effect and function of the functional module of the mobile terminal. Thus, the installed Java software does not need to be started on the JAM interface, and can be started quickly and conveniently.

One embodiment of the present invention provides an apparatus for integrating Java software into a mobile terminal.

Figure 3:
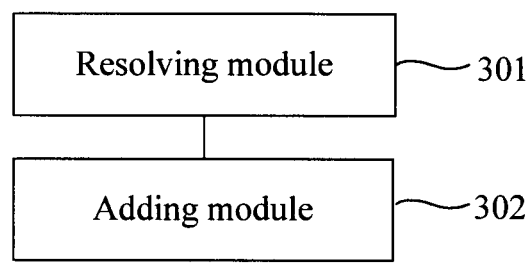
FIG. 3 is a structural view of an apparatus for integrating Java software into a mobile terminal according to one embodiment of the present invention.

FIG. 3 is a structural view of an apparatus for integrating Java software into a mobile terminal according to one embodiment of the present invention. As shown in FIG. 3, the apparatus includes: a resolving module 301 and an adding module 302. The resolving module 301 is configured to install and resolve the Java software configured with an extended attribute to obtain the contact data corresponding to the extended attribute. The adding module 302 is configured to add an option for starting the Java software to the user interface of the mobile terminal according to the contact data.

Another embodiment of the present invention provides another apparatus for integrating Java software into a mobile terminal.

Figure 4:
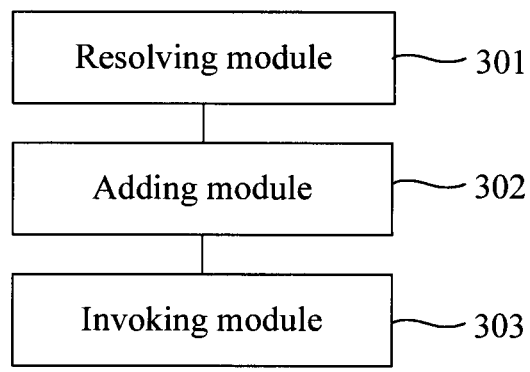
FIG. 4 is a structural view of an apparatus for integrating Java software into a mobile terminal according to another embodiment of the present invention.

FIG. 4 is a structural view of the apparatus for integrating Java software into the mobile terminal according to another embodiment of the present invention. As shown in FIG. 4, the apparatus, based on the preceding embodiment, further includes: an invoking module 303 configured to trigger the application entry of the Java software in the contact data through the option to invoke the Java software.

Figure 5:
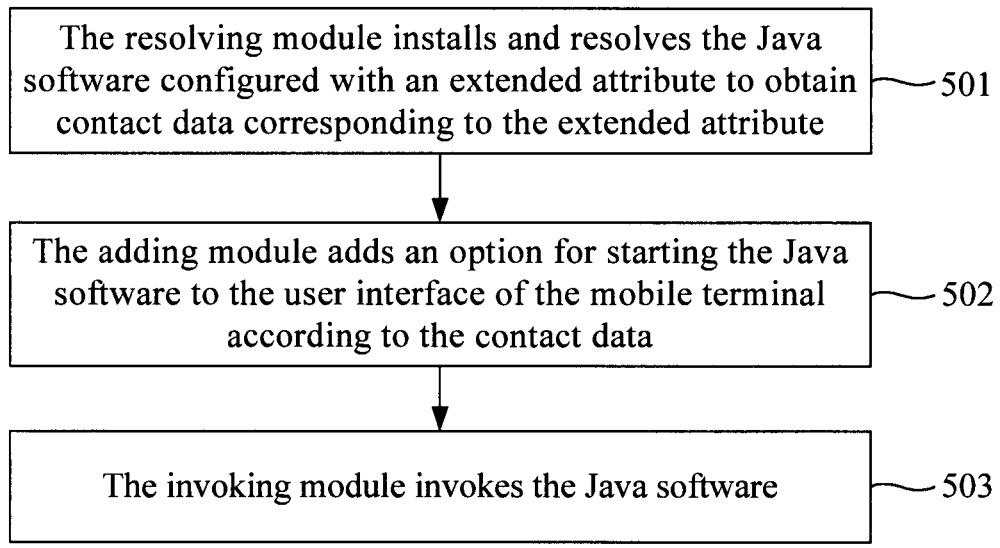
FIG. 5 illustrates a working procedure of an apparatus for integrating Java software into a mobile terminal according to another embodiment of the present invention.

FIG. 5 illustrates the working procedure of the apparatus for integrating the Java software into the mobile terminal according to one embodiment of the present invention. As shown in FIG. 5, the working procedure of the apparatus includes:

Step 501: The resolving module installs and resolves the Java software configured with an extended attribute to obtain contact data corresponding to the extended attribute.

In the actual application, the Java software with the extended attribute such as XML and TXT can be set on the mobile terminal. In the installation of the Java software, the user interface for starting the Java software can be integrated into the user interface of the functional module on the mobile terminal.

After the user downloads the Java software configured with the extended attribute, the resolving module 301 installs and resolves the extended attribute of the Java software to obtain the contact data corresponding to the extended attribute. In this embodiment, the Java software with the extended attribute of XML is taken as an example to describe the technical solution. The extended attribute of the JAD file in the Java software can be set to "MIDletX-Integration:config.XML". The XML file corresponding to the extended attribute of "MIDletX-Integration:config.XML" is saved in the JAR file.

The extended attribute of the JAD file of the Java software resolved by the resolving module 301 is described as follows:

MIDletX-Integration:config.XML //Indicates that the Java software can be integrated into the user interface of the existing functional module
MIDlet-1: DragonFire, /icon.png, com.huawei.Midlet //Indicates that the Java software includes a small application millet-1 whose entry is com.huawei.Midlet The resolving module 301 also resolves the config.XML file saved in the JAR file matching the JAD file. The contact data of the JAR file includes the following contents:

```
<phonebook>    //Indicates that the Java software needs to
be integrated into the user interface of the phone book
    <contactMainScreen>    //Indicates that the Java
software needs to be integrated on the main list interface
of the phone book
        <optionMenu>    //Indicates that the Java
software needs to be integrated with the menu of the
phone book
            <item label="menu item1">  //Indicates
that a menu option with the title of menu item1 is added
                <command>com.huawei.Midlet
</command>//Indicates that the user interface is a user interface
for running the com.huawei.Midlet
            </item>
            <item>
            ......
            </item>
        </optionMenu>
    </contactMainlist>
</phonebook>
```

The contact data of the Java software resolved by the resolving module 301 indicates that the user interface of the Java software is added to the main list interface of the phone book. The user interface is a menu option on the main list interface of the phone book. The resolving module 301 notifies the resolving result to the functional module of the phone book. In the actual application, the contents of the JAR file may be modified according to the actual requirement. The Java software may be integrated into the user interface of the call record and file manager.

Step 502: The adding module adds the option for starting the Java software to the user interface of the mobile terminal according to the contact data.

After the resolving module 301 installs and resolves the Java software, the installation information of the Java software is sent to the functional module corresponding to the phone book. When the functional module corresponding to the phone book is initially started or the functional module corresponding to the phone book receives the installation information of the Java software, the interface for the adding module 302 to obtain the contact data from the resolving module 301 is as follows:

```
getOptionMenuLabel
getOptionMenuCommandID
......
```

The adding module 302 displays the user interface of the Java software on the menu on the main list interface of the phone book according to the obtained contact data, including the menu option, soft key or list for starting or running the Java software. In the actual application, the function of the adding module 302 can be implemented by the functional module corresponding to the phone book.

Step 503: The invoking module invokes the Java software.

When a user needs to start or run the Java software, the invoking module 303 obtains the contact data of the Java software by selecting the user interface of the Java software, starts or runs the main list interface of the phone book including the user interface of the Java software, and obtains the application entry "com.huawei.Midlet" of the Java software. Then the Java software may be started or run.

If the user deletes the Java software, the user interface of the Java software is also deleted automatically from the associated user interface.

In this embodiment, the apparatus for integrating the Java software into the mobile terminal resolves the extended attribute of the Java software and installs the Java software through the resolving module, and displays the user interface for starting the Java software on the associated user interface through the adding module. This does not affect the effect and function of the functional module of the mobile terminal. Thus, the installed Java software does not need to be started on the JAM interface, and can be started quickly and conveniently.

One embodiment of the present invention provides a mobile terminal.

Figure 6:
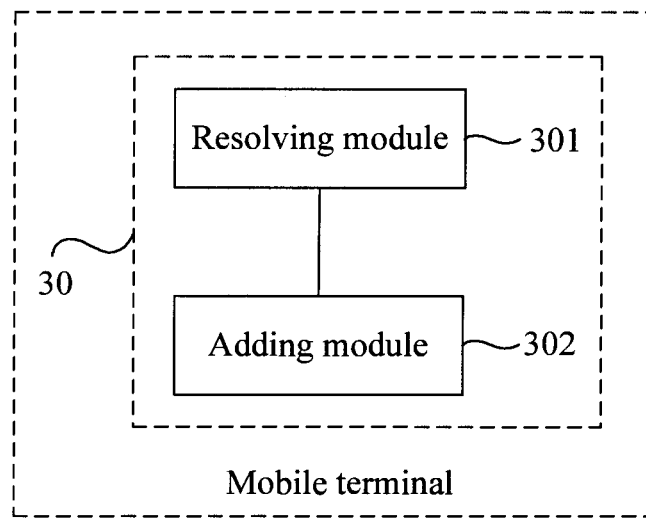
FIG. 6 is a structural view of a mobile terminal according to one embodiment of the present invention.

As shown in FIG. 6, the mobile terminal according to one embodiment of the present invention includes an apparatus 30 for integrating the Java software into the mobile terminal. The apparatus includes: a resolving module 301 and an adding module 302. The resolving module 301 is configured to install and resolve the Java software configured with an extended attribute to obtain contact data corresponding to the extended attribute. The adding module 302 is configured to add the option for starting or running the Java software to the user interface of the mobile terminal according to the content of the contact data and display the user interface for starting the Java software. In this embodiment, the apparatus 30 for integrating the Java software into the mobile terminal can be designed with the structure of the apparatus shown in FIG. 4.

In this embodiment, the mobile terminal resolves the extended attribute of the Java software and displays the user interface for starting the Java software on the user interface corresponding to the extended attribute. This does not affect the effect and function of the functional module of the mobile terminal. Thus, the installed Java software does not need to be started on the JAM interface, and can be started quickly and conveniently.

Persons of ordinary skill in the art may understand that all or part of steps according to the embodiments of the present invention may be implemented by a program instructing relevant hardware. The program may be stored in a computer readable storage medium. When the program runs, the steps of the method in the embodiment are executed. The storage medium may be a read only memory (ROM), a random access memory (RAM), a magnetic disk or a compact disk-read only memory (CD-ROM), which can store program codes.

It should be noted that the preceding embodiments are illustrative only. The technical solution of the present invention is not limited thereto. Although the present invention is described in detail by referring to the exemplary embodiments, those skilled in the art should understand that various modifications or equivalent replacements can be made to the embodiments of the present invention. Such modifications and equivalent replacements fall into the principle and scope of the invention.

What is claimed is:

1. A computer implemented method for integrating Java software into a mobile terminal, comprising:

installing and resolving Java software configured with an extended attribute to obtain contact data corresponding to the extended attribute; and adding an option for starting the Java software to a user interface of an existing application of the mobile terminal according to the contact data, wherein the contact data comprises a location and format of the added option for the Java software, and data of an application entry of the Java software and defines an already existing application to which the option is added, wherein the option is deleted automatically from the user interface of the existing application in response to a user deleting the Java software from the mobile terminal;

wherein adding the option for starting the Java software to the user interface of the mobile terminal comprises:

sending installation information of the Java software to a functional module corresponding to the user interface;

obtaining, by the functional module corresponding to the user interface, the contact data of the Java software in response to the functional module corresponding to the user interface being started initially or the installation information of the Java software being received; and displaying, by the functional module corresponding to the user interface, an option of the Java software on the user interface according to the contact data of the Java software.

2. The method according to claim 1, wherein installing and resolving the Java software configured with the extended attribute to obtain the contact data corresponding to the extended attribute comprises:

obtaining the extended attribute from a Java application descriptor (JAD) file of the Java software by resolving the file, and obtaining the location of the added option for the Java software from a Java archive (JAR) file of the Java software.

3. The method according to claim 1, wherein after the step of adding the option for starting the Java software on the user interface of the mobile terminal, the method further comprises:

triggering the application entry of the Java software in the contact data through the option to invoke the Java software.

4. The method according to claim 1, wherein the format of the option of the Java software comprises:

a menu option, a soft key, or a list.

5. An apparatus for integrating Java software into a mobile terminal, comprising:

a processor; and a memory coupled to the processor, the memory comprising instructions that, when executed by the processor, cause the apparatus to:

install and resolve Java software configured with an extended attribute to obtain contact data corresponding to the extended attribute;

add an option for starting the Java software to a user interface of an existing application of the mobile terminal according to the contact data;

send installation information of the Java software to a functional module corresponding to the user interface obtain the contact data of the Java software in response to the functional module corresponding to the user interface being started initially or the installation information of the Java software being received; and display, by the functional module corresponding to the user interface, an option of the Java software on the user interface according to the contact data of the Java software;

wherein the contact data comprises a location and format of the added option for the Java software, and data of an application entry of the Java software and defines an already existing application to which the option is added, wherein the option is deleted automatically from the user interface of the existing application in response to a user deleting the Java software from the mobile terminal.

6. The apparatus according to claim 5, further comprising instructions that, when executed by the processor, cause the apparatus to:

trigger an application entry of the Java software in the contact data through the option to invoke the Java software.

7. A mobile terminal, comprising the apparatus for integrating the Java software into the mobile terminal according to claim 5.

* * * * *